US012573825B2

(12) United States Patent
Takahashi et al.

(10) Patent No.: US 12,573,825 B2
(45) Date of Patent: Mar. 10, 2026

(54) EQUIPMENT MODULE AND PLANT

(71) Applicant: JGC Corporation, Yokohama (JP)

(72) Inventors: Hiroki Takahashi, Yokohama (JP);
Ryota Ikeya, Yokohama (JP)

(73) Assignee: JGC Corporation, Yokohama (JP)

( * ) Notice: Subject to any disclaimer, the term of this
patent is extended or adjusted under 35
U.S.C. 154(b) by 0 days.

(21) Appl. No.: 18/488,206

(22) Filed: Oct. 17, 2023

(65) Prior Publication Data

US 2025/0047085 A1 Feb. 6, 2025

(30) Foreign Application Priority Data

Oct. 21, 2022 (WO) .................. PCT/JP2022/039362

(51) Int. Cl.
H02G 3/18 (2006.01)
H02G 3/08 (2006.01)

(52) U.S. Cl.
CPC ............... H02G 3/081 (2013.01); H02G 3/18
(2013.01)

(58) Field of Classification Search
CPC ........... H02G 3/081; H02G 3/04; H02G 3/08;
H02G 3/18; H02G 3/22; H02G 3/30;
H02G 3/34; H02G 3/36; E04H 5/02;
H01B 9/00; H01B 11/00; H05K 7/02;
H05K 7/14

USPC .......................................................... 174/50
See application file for complete search history.

(56) References Cited

FOREIGN PATENT DOCUMENTS

| JP | 7-18887 A | 1/1995 |
|---|---|---|
| JP | 1113416 A | 1/1999 |
| WO | 2014/028961 A1 | 2/2014 |
| WO | 21021/059454 A1 | 4/2021 |

*Primary Examiner* — Timothy J Thompson
*Assistant Examiner* — Michael F McAllister
(74) *Attorney, Agent, or Firm* — Jordan and Koda, PLLC;
Steven P. Koda

(57) ABSTRACT

A technique for connecting a cable to perform power supply
or signal exchange with respect to an instrument provided in
an equipment module for building a fluid handling plant. An
equipment module configuring a plant where a fluid is
handled includes: an equipment module frame where equip-
ment configuring the plant and instruments are installed; and
a junction box for relaying cables to perform power supply
or signal exchange with respect to the plurality of instru-
ments. The junction box includes a primary side connecting
portion to which the first cable extending from a control
room installed outside the equipment module frame is
connected, and a secondary side connecting portion to which
the second cable extending from the plurality of instruments
is connected. The junction box is provided at an end portion
in the equipment module frame such that the primary side
connecting portion faces the outside of the equipment mod-
ule frame.

13 Claims, 9 Drawing Sheets

EQUIPMENT MODULE AND PLANT

BACKGROUND OF THE INVENTION

The present invention relates to a technique for building a fluid handling plant.

Fluids are handled at various plants such as natural gas (LNG) plants where natural gas liquefaction, natural gas liquid separation and recovery, and so on are performed, petroleum refining plants where distillation, desulfurization, and so on are performed on crude oil and various intermediate products, chemical plants where petrochemical products, intermediate chemical products, polymers, and so on are produced, boiler plants where hot steam and liquids are obtained by heat addition to fluids, power plants where fluids are used to drive turbines and generate electricity, and waste treatment plants for low-level radioactive waste.

It should be noted that in the present application, "fluid" includes not only gases and liquids but also granular materials with fluidity (powder, granules, pellets, and the like).

These plants include multiple pieces of equipment such as static equipment such as tower tanks and heat exchangers, dynamic equipment such as pumps, compressors, and turbines, and pipes provided between these static equipment and dynamic equipment. Further, multiple instruments are attached to the equipment so that fluid states (temperature, pressure, flow rate, and the like) and equipment states (vibration, power supply amount, and the like) are detected and the detected information is used for equipment operation.

In today's plant construction, modularization efforts are made so that multiple pieces of plant equipment and instruments (hereinafter, the equipment will be referred to as "equipment group") are divided into blocks and the equipment groups of the respective blocks are incorporated into a common frame (for example, LNG plant-related WO2014/028961).

Meanwhile, a cable is connected to each instrument installed in an equipment module so that power supply or signal exchange is performed with control equipment and power supply equipment provided in a control room for plant-wide control. In connecting this cable, it is necessary to pull the cable laid from the control room side into the equipment module and connect the cable to each instrument. As will be described later, this work affects the period of plant construction as scaffolding needs to be installed at the frame and removed after the cable is pulled into the equipment module from the outside.

It should be noted that WO2014/028961 is without description as to a configuration for more efficiently pulling a cable into a module.

In addition, JPH11-13416A describes a configuration in which in a power plant, a terminal station, which is electrical instrumentation equipment, is provided in an internal space of a frame supporting a gas turbine, a generator, and a steam turbine. Here, the power plant described in JPH11-13416A has a structure in which side surfaces of a steel framework are covered with steel panels. Further, auxiliary equipment (auxiliary equipment and pipes for a control oil system, a lubricant system, a coolant system, and a hydrogen gas system, and electrical instrumentation equipment) necessary for the operation of the power plant is accommodated in the frame which is a space covered with the steel panels. Further, according to the configuration of the power plant illustrated in JPH11-13416A, the terminal station is provided in the vicinity of a lower end portion of an inner wall surface of the steel panel covering the frame.

In this manner, in the power plant described in JPH11-13416A, the equipment necessary for the operation is packaged. In this case, a configuration in which another frame supporting or accommodating another equipment is provided next to the power plant and the work of deliberately routing external cables through the other frame and then pulling the external cable into the frame of the power plant is not only not described in JPH11-13416A but also is difficult to assume. If the external cables from an external control room are desired to be connected, a cable tray may be installed along a ceiling surface or inner wall and a floor surface of a turbine building, and the external cables may be routed via the cable tray.

SUMMARY OF THE INVENTION

The invention has been made under such a background, and an object of the invention is to provide a technique for efficiently connecting a cable to perform power supply or signal exchange with respect to an instrument provided in an equipment module for building a fluid handling plant.

This equipment module is an equipment module configuring a plant where a fluid is handled, the equipment module including:

an equipment module frame with a multi-story structure in which equipment configuring the plant and at least one instrument used in operating the equipment are installed and in which, when a floor closest to a ground is referred to as a first floor, at least a second floor is disposed above the first floor; and a junction box for relaying a cable to perform power supply or signal exchange with respect to the instrument, in which the junction box includes a primary side connecting portion to which a first cable extending from a control room installed outside the equipment module frame is connected, and a secondary side connecting portion to which a second cable extending from the instrument is connected, and the junction box is provided at an end portion in the second or higher floor of the equipment module frame.

The equipment module may have the following features.

(a) The junction box is provided on a delivery floor which is the second or higher floor and on which a work of delivering the first cable from the outside is performed, and the cable is also relayed to an instrument provided on a floor other than the delivery floor by the junction box provided on the delivery floor.

(b) The secondary side connecting portion and the instrument are connected in advance by the second cable. At this time, the first cable is a multi-core cable, and the second cable is a single-core cable or a multi-core cable including a smaller number of core wires than the first cable.

(c) A package area where package equipment configuring the plant, at least one package instrument attached to the package equipment, and a package junction box for relaying a cable to perform power supply or signal exchange with respect to the package instrument are collectively installed is provided, and a secondary side connecting portion of the package junction box and the package instrument are connected in advance by a third cable, and the secondary side connecting portion of the junction box and a primary side connecting portion of the package junction box are connected in advance by a fourth cable. At this time, the first cable and the fourth cable are multi-core cables, and the third cable is a single-core cable or a multi-core cable including a smaller number of core wires than the first cable and the fourth cable.

(d) A fifth cable is provided in order to perform power supply or signal exchange with respect to at least one external instrument configuring the plant and attached to external equipment provided outside the equipment module, and one end side of the fifth cable is connected to the secondary side connecting portion of the junction box, and the other end side is bundled at a position facing the external instrument in a state where the equipment module frame is disposed at a site adjacent to the external equipment. At this time, the first cable is a multi-core cable, and the fifth cable is a single-core cable or a multi-core cable including a smaller number of core wires than the first cable.

In addition, another equipment module is an equipment module configuring a plant where a fluid is handled, the equipment module including:

a pipe rack frame in which equipment configuring the plant and at least one instrument used in operating the equipment are installed and, further, which holds a pipe through which the fluid handled at the plant flows;

a junction box for relaying a cable to perform power supply or signal exchange with respect to the instrument; and a cable tray for holding a first cable extending from a control room installed outside the pipe rack frame, in which the junction box includes a primary side connecting portion to which the first cable is connected, and a secondary side connecting portion to which a second cable extending from the instrument is connected, and the junction box is provided along the cable tray.

The other equipment module may have the following features.

(e) In the equipment module before the first cable is held by the cable tray, the secondary side connecting portion of the junction box and the instrument are connected in advance by the second cable. At this time, the first cable is a multi-core cable, and the second cable is a single-core cable or a multi-core cable including a smaller number of core wires than the first cable.

Further, this plant where a fluid is handled includes:

an equipment module including an equipment module frame with a multi-story structure in which equipment configuring the plant and at least one instrument used in operating the equipment are installed and in which, when a floor closest to a ground is referred to as a first floor, at least a second floor is disposed above the first floor, and a junction box for relaying a cable to perform power supply or signal exchange with respect to the instrument, in which the junction box includes a primary side connecting portion to which a first cable extending from a control room installed outside the equipment module frame is connected, and a secondary side connecting portion to which a second cable extending from the instrument is connected, and in which the junction box is provided at an end portion in the second or higher floor of the equipment module frame; and a pipe rack that is a frame holding the pipe through which the fluid flows and the first cable, in which the equipment module is disposed adjacent to the pipe rack, and in the equipment module frame configuring the equipment module, the end portion is at a position facing the pipe rack.

The plant may have the following features.

(f) The plant includes a plurality of the equipment modules disposed adjacent to the pipe rack, in which in each of the equipment module frames configuring the respective equipment modules, the end portion is at the position facing the pipe rack.

In the equipment module of the invention, the junction box for cable relay is provided at the end portion in the module frame or along the cable tray, and thus the work of receiving the cable from the outside and connecting the cable to the junction box can be made efficient.

BRIEF DESCRIPTION OF THE DRAWINGS

FIG. 4 is a front view illustrating an internal configuration example of a junction box;

FIG. 7 is a plan view of an equipment module according to a second embodiment;

DETAILED DESCRIPTION OF THE INVENTION

First, before describing embodiments of the invention, the configuration of an equipment module 101a of the related art and problems arising in pulling a cable into the equipment module 101a of the configuration of the related art will be described with reference to FIG. 1.

Figure 1:
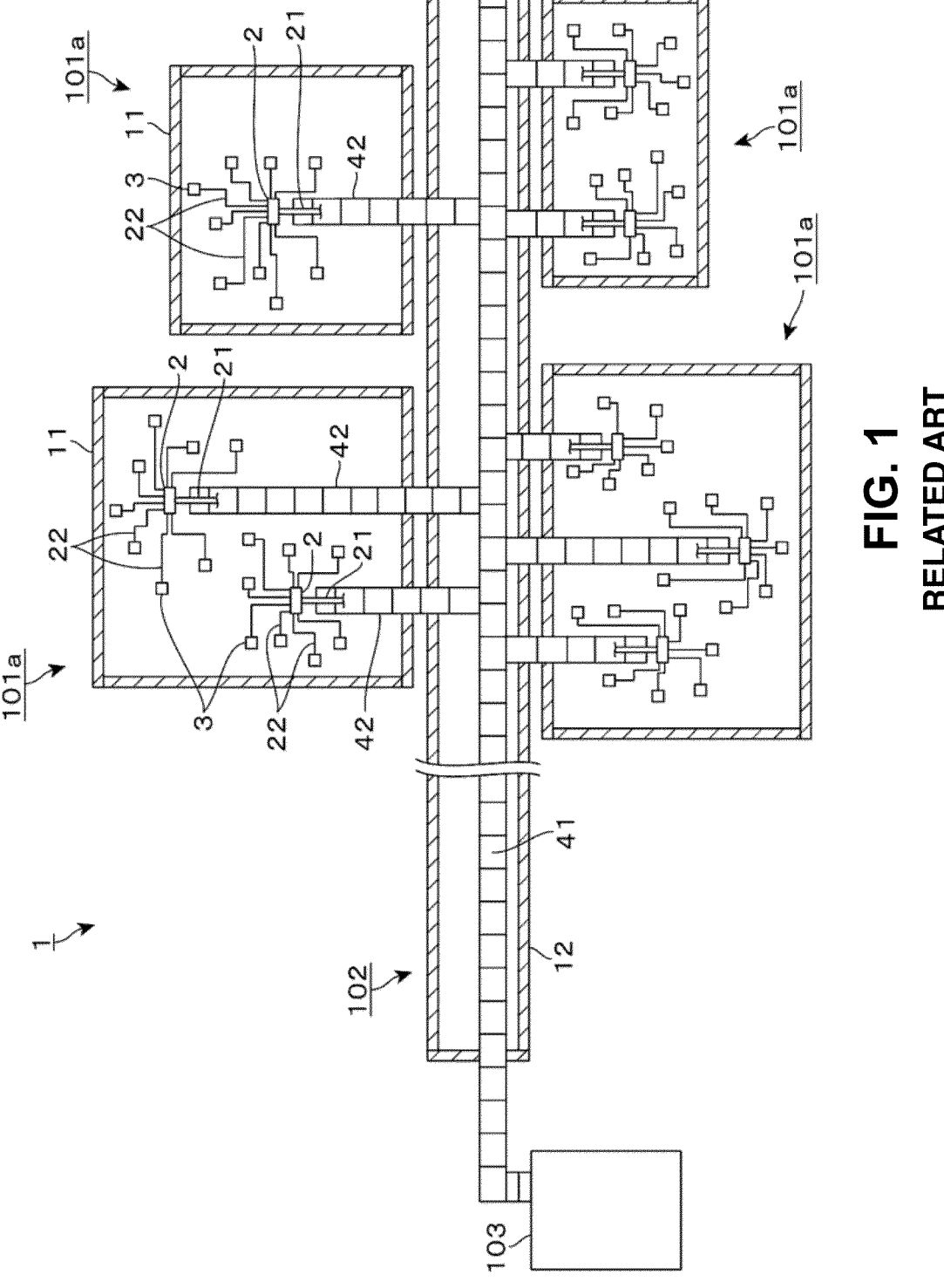
FIG. 1 is a plan view of a plant according to an example of the related art.

FIG. 1 is an enlarged plan view schematically illustrating a part of an LNG plant 1 as an example of a plant configured by a plurality of the equipment modules 101a. The LNG plant 1 of this example includes, in common equipment module frames 11, the one or more equipment modules 101a accommodating equipment groups configuring the LNG plant 1.

It should be noted that for convenience of illustration, in the equipment modules 101, 101a, 101b, and 101c that are illustrated in FIGS. 1 to 9 and a pipe rack 102 to be described later, description of individual equipment and pipe is omitted except for some cases. In addition, the equipment modules 101, 101a, 101b, and 101c and the pipe rack 102 illustrated in FIGS. 1 to 5 and FIGS. 7 to 9 schematically illustrate plan views regarding floors where the work of pulling in a first cable 21, which will be described later, is performed.

The equipment modules 101a illustrated in FIG. 1 are structures in which, for example, the LNG plant 1 is divided into blocks along the flow of natural gas (NG) processing and the equipment groups configuring the respective blocks are accommodated in the equipment module frames 11. The equipment module frame 11 is a steel-framed frame structure having a substantially rectangular planar shape and configured with a plurality of floors. In the equipment module frame 11 described in the present application, a floor closest to the ground is referred to as a first floor, and a configuration in which at least a second floor is disposed above the first floor is referred to as a multi-story structure. The equipment module frame 11 with a multi-story structure may include three or more floors above the second floor. Normally, the structure is such that outer peripheral surfaces of the frame structure of the equipment module 101a are not covered with steel panels or the like. For this reason, the internal space of the equipment module 101a is in the state of communication with the external space. In addition, the equipment module frame 11 having a substantially rectangular shape in a plan view is configured with, for example, a width dimension of 20 meters or more on one side. The equipment and instruments of each block are disposed in a distributed manner at preset positions of the respective floors in the equipment module frame 11. At least one piece of equipment and at least one instrument are disposed in the equipment module 101a. In addition, the LNG plant 1 of this example is provided with the pipe rack 102 holding multiple pipes 44 through which a fluid exchanged between the respective equipment modules 101a flows (refer to FIG. 6). The pipe rack 102 may also be configured by one or more pipe rack modules. In the pipe rack modules, the multiple pipes 44 are held in a pipe rack frame 12 configured in one or a plurality of floors.

Figure 6:
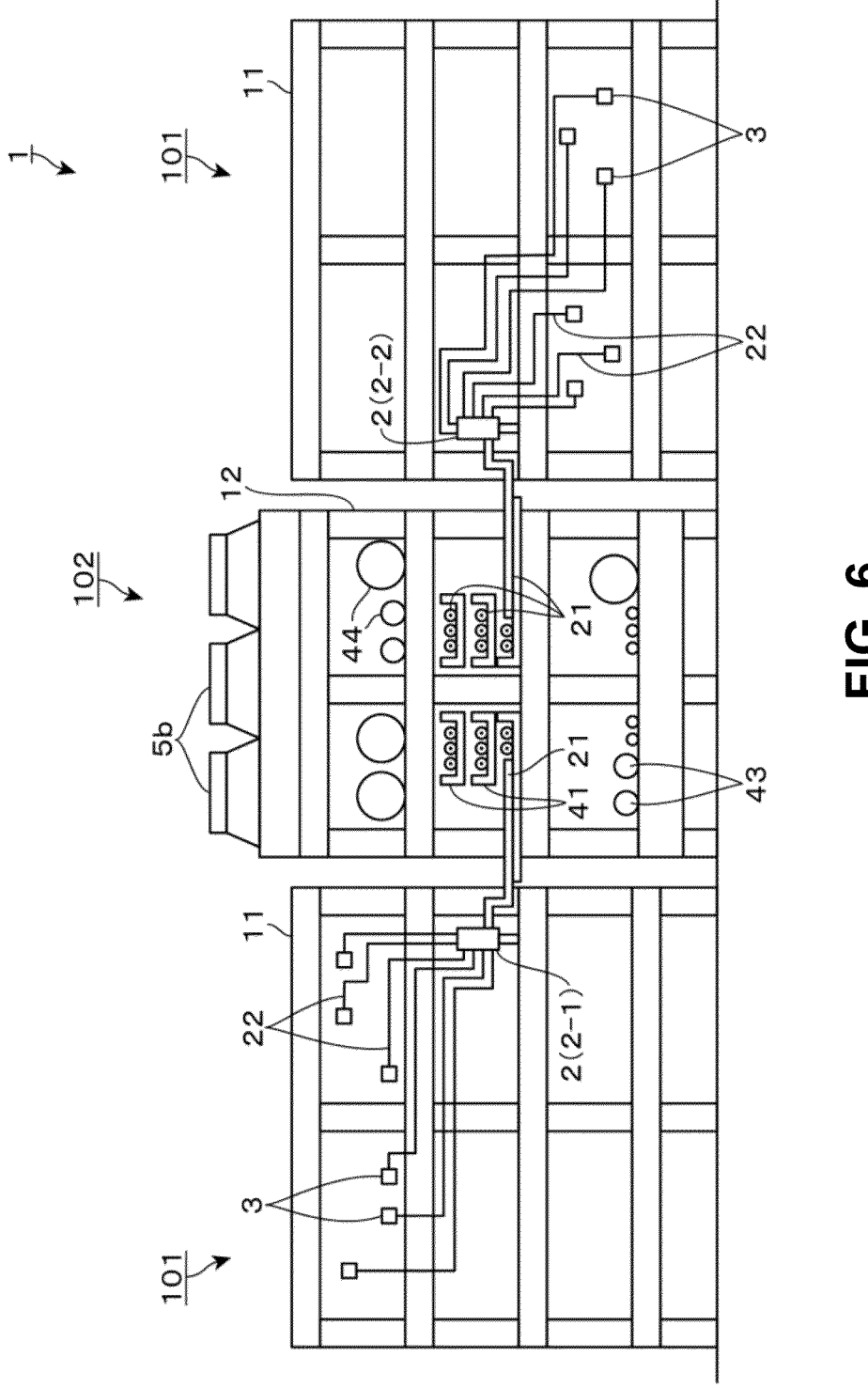
FIG. 6 is a longitudinal cross-sectional side view of the equipment module and a pipe rack related to laying the second cables 22 toward other floors.
Figure 9:
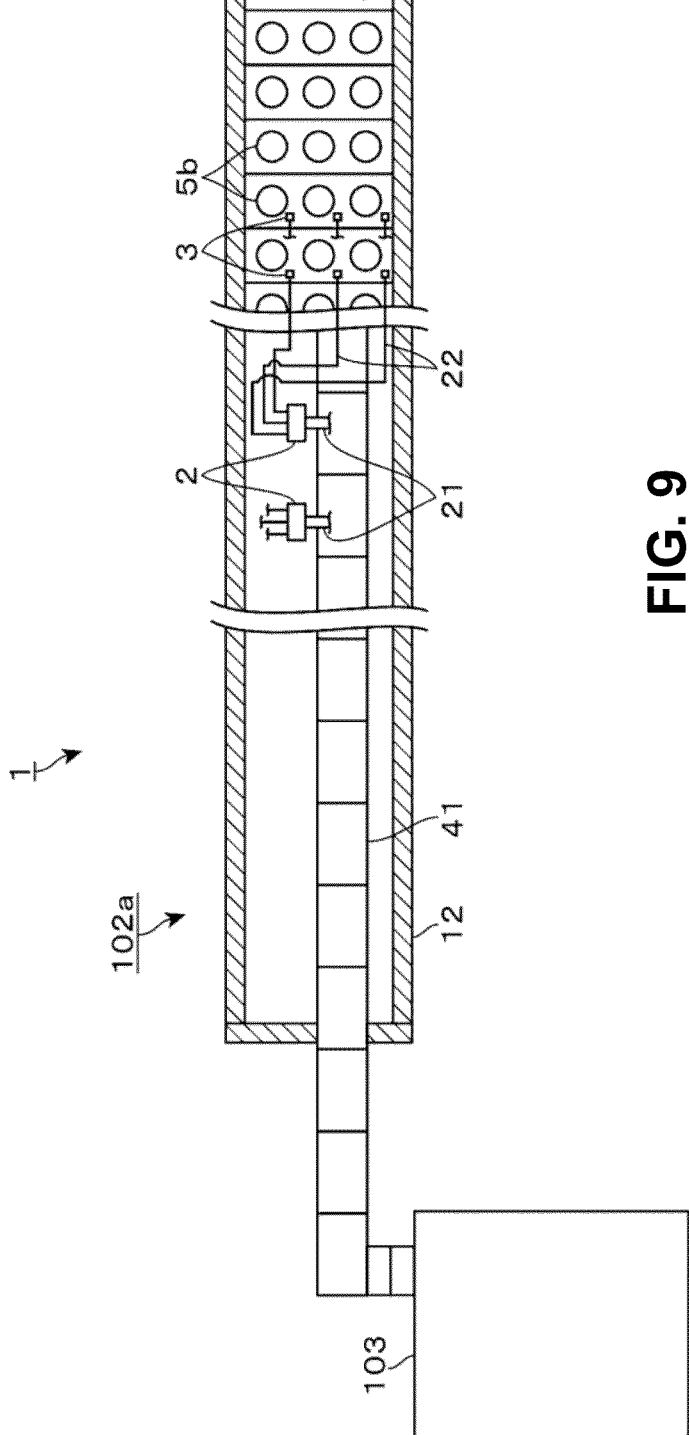
FIG. 9 is a plan view of a pipe rack module according to a fourth embodiment.

Further, as illustrated in FIGS. 6 and 9 to be described later, multiple air-cooled heat exchangers (ACHEs) 5b for cooling the fluid handled in the LNG plant 1 may be provided in, for example, the top portion of the pipe rack 102.

These pipes 44 and ACHEs 5b also correspond to some of the equipment configuring the LNG plant 1. From this point of view, the pipe rack module configuring the pipe rack 102 corresponds to a type of equipment module.

These equipment modules 101a and pipe rack modules are built at a factory different from the construction site of the LNG plant 1, transported to the construction site, and then installed in a preset region in the site. In the example illustrated in FIG. 1, the pipe rack 102 extending in a direction crossing the construction site is formed by interconnecting the plurality of pipe rack modules. Further, the plurality of equipment modules 101a are disposed adjacent to this pipe rack 102. Further, the plurality of equipment modules 101a are disposed adjacent to this pipe rack 102. Further, the LNG plant 1 is configured by connecting the pipes 44 between these equipment modules 101a and the pipe rack 102 and by connecting cables for power supply or signal exchange to instruments 3 and equipment. Cables are connected to the instruments 3 provided in the equipment modules 101a and the pipe rack 102 configured as described above so that power supply or signal exchange is performed with control equipment and power supply equipment in a control room 103 provided at the construction site. A plurality of the first cables 21, which are multi-core cables or the like, are pulled out of the control room 103. These first cables 21 are laid toward the instruments 3 in the respective equipment modules 101a and the pipe rack in a state of being held by a cable tray 41 provided in the pipe rack 102. It should be noted that the first cable 21 being a multi-core cable is not an essential requirement. For example, in a case where only one instrument 3 is installed in the equipment module 101a, the first cable 21 may be configured by a single-core cable. In addition, in FIG. 1, the first cable 21 that is laid on the cable tray 41 of the pipe rack 102 is not illustrated.

In the following description of FIG. 1, the work of connecting cables (first cable 21, second cable 22) to the plurality of instruments 3 provided in the equipment module 101a will be described.

Each of the first cables 21 laid on the pipe rack 102 is pulled toward the inside of the corresponding equipment module 101a when the tip portion thereof reaches the position of disposition of the equipment module 101a provided with the instrument 3 to be connected. A junction box 2 for cable (first cable 21, second cable 22) relay is provided in the equipment module 101a. The junction box 2 includes a primary side connecting portion 203 and a secondary side connecting portion 204 illustrated in FIG. 4 which will be described later.

The tip portion of the first cable 21 pulled into the control room 103 is connected to the primary side connecting portion 203 of the junction box 2. Meanwhile, the base end portions of a plurality of the second cables 22, which are single-core cables or multi-core cables including a smaller number of core wires than the first cable 21, are connected to the secondary side connecting portion 204 of the junction box 2. The respective second cables 22 are laid toward the instruments 3 disposed in the equipment module 101a, and the tip portions thereof are connected to the respective instruments 3.

In addition, the junction boxes 2 are provided in other floors as well as the floors where the first cables 21 are pulled in from the pipe rack 102. Further, a part of the first cable 21 pulled into the control room 103 is laid up to the junction box 2 of another floor and connected to the instrument 3 disposed in each floor via the junction box 2 and the second cable 22.

According to the above configuration, the first cable 21, which is a multi-core cable, branches at the junction box 2, and the second cable 22 that has branched is connected to the instrument 3. As a result, the control equipment and the power supply equipment provided in the control room 103 are connected to the respective instruments 3 in the equipment modules 101a, and power supply or signal exchange can be performed.

Here, in the equipment module 101a of the related art, the junction box 2 is disposed in the middle region of the plurality of instruments 3 as illustrated in, for example, FIG. 1. According to this disposition, the total extension of the second cable 22 branching off the junction box 2 and laid can be reduced.

Meanwhile, the plurality of instruments 3 are disposed in a distributed manner in the respective floor of the equipment module 101a. Therefore, when the junction box 2 is disposed in middle region thereof, the position of installation of the junction box 2 is likely to be the middle region of the respective floors of the equipment module 101a. For this reason, as illustrated in FIG. 1, it is necessary to install a cable tray 42 in the equipment module 101a as well and pull the first cable 21 from the cable tray 41 on the pipe rack 102 side into the cable tray 42 on the equipment module 101a side.

Here, in order to pull the first cable 21 into the internal region of the equipment module 101a, the first cable 21 to be pulled in is also required to have a suitable length, and the weight of the first cable 21 handled during the pull-in work also increases in accordance with the length. Therefore, it is necessary to install scaffolding between the pipe rack 102 and the equipment module 101a so that the pull-in work is performed in a stable work environment. Particularly, the equipment module 101a, which is built at the factory and is installed at the construction site, is disposed and fixed onto column bases provided at the construction site in advance. For this reason, for example, even in a case where pull-in work is performed on the first floor, the height of the work position from the site surface is 3 meters or more in some cases, and it is necessary to install scaffolding in the same manner as when pull-in work is performed on the second or higher floor. In this case, scaffolding installation work and post-pull-in scaffolding dismantling work occur with respect to each of the plurality of equipment modules 101a installed in the LNG plant 1, which are one of bottlenecks hindering plant construction period reduction.

Based on the above problems, the equipment modules 101, 101b, and 101c according to the embodiments of the invention are configured to enable connection of the first cable 21 to the junction box 2 without requiring pull-in work that requires scaffolding installation.

Hereinafter, the configurations of the equipment modules 101, 101b, and 101c according to the respective embodiments will be described with reference to FIGS. 2 to 9. It should be noted that in FIGS. 2 to 9 to be described below, the same components as those in the LNG plant 1 described with reference to FIG. 1 are denoted by the same reference numerals as those used in FIG. 1 and redundant descriptions are omitted.

Figure 2:
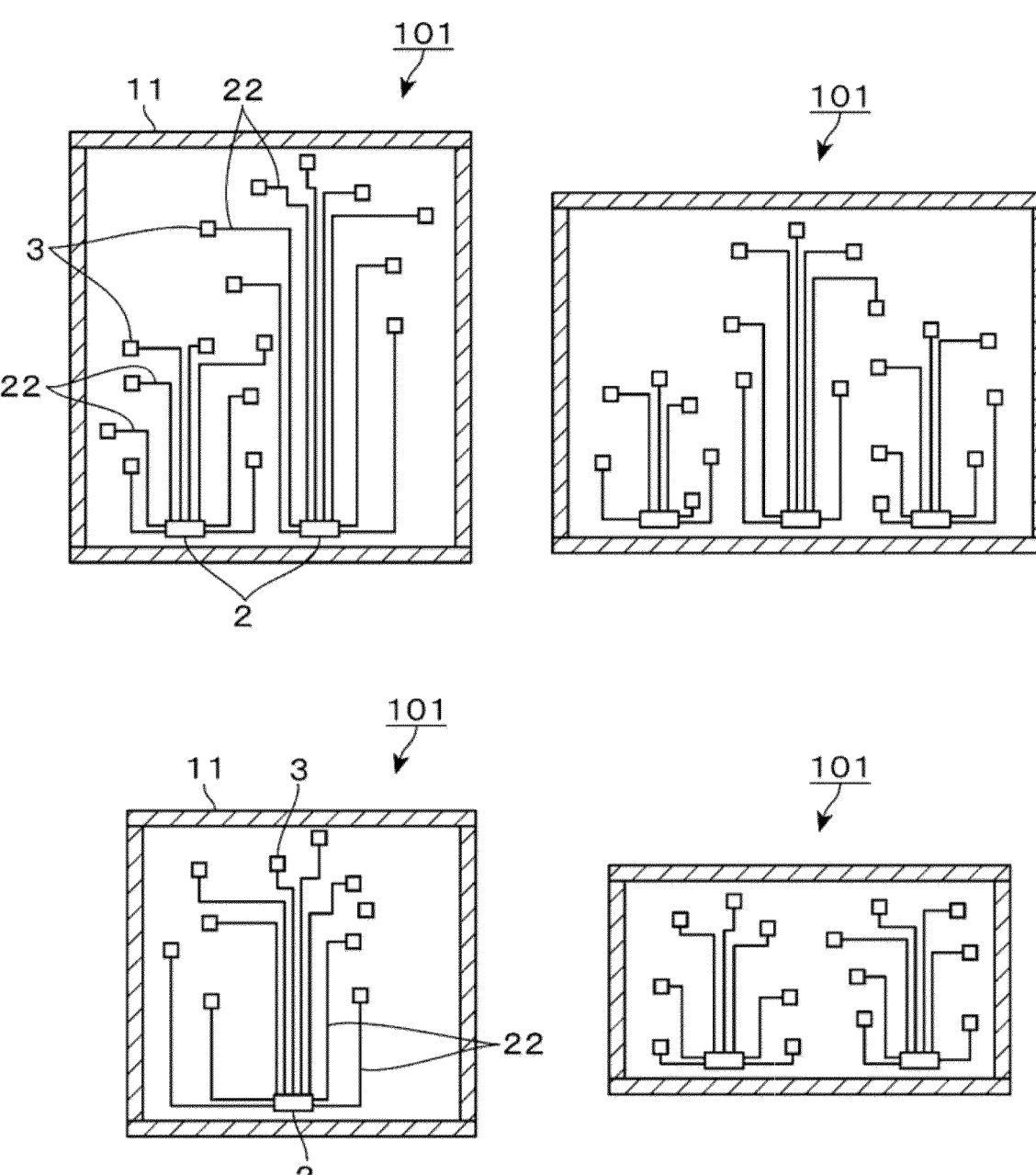
FIG. 2 is a plan view of an equipment module configuring a plant according to a first embodiment.

FIG. 2 illustrates a configuration example of the equipment module 101 according to a first embodiment. Each equipment module 101 of this example is provided with the junction box 2 at an end portion in the second or higher floor of the equipment module frame 11. "End portion" refers to a region in the equipment module frame 11 where the tip portion of the first cable 21 can be delivered from the pipe rack 102 toward the equipment module 101 without providing scaffolding. More specifically, "end portion" corresponds to a range of 5 meters or less from an outer peripheral end position in the plan view of the equipment module 101. Preferably, "end portion" corresponds to a range of 2 meters or less from the outer peripheral end position.

Figure 3:
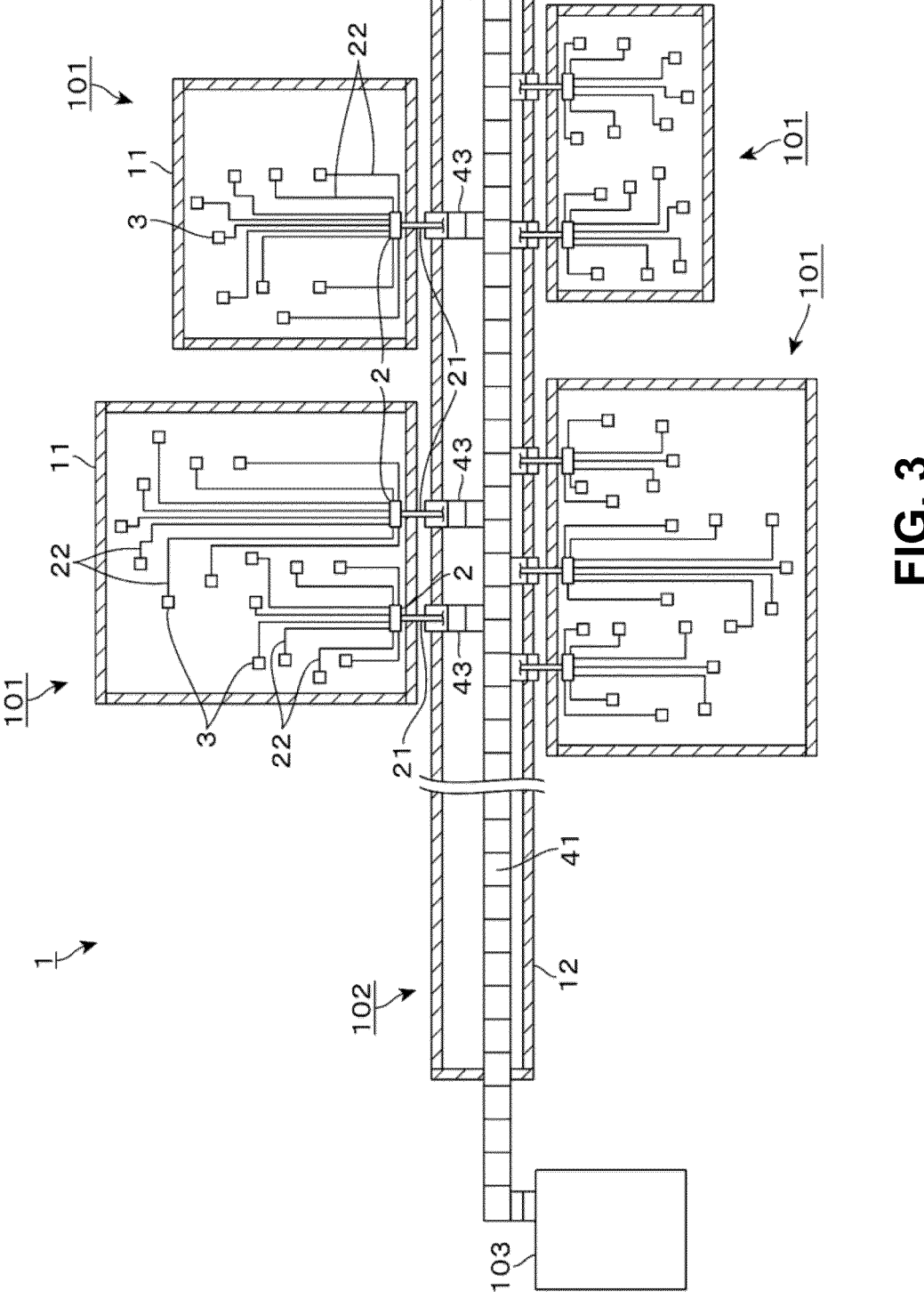
FIG. 3 is a plan view of the plant according to the first embodiment.

In addition, the junction box 2 is provided such that an access surface provided with an opening-closing door for access of workers faces the inside of the equipment module frame 11. Further, for example, the equipment module frame 11 formed in a rectangular shape in the plan view has four sides. At this time, as illustrated in FIG. 3, the junction box 2 is provided along the side that faces the pipe rack 102 when the equipment module 101 is disposed adjacent to the pipe rack 102. With these configurations, the junction box 2 is disposed at a position facing the pipe rack 102, and the length of the first cable 21 delivered from the pipe rack 102 to the equipment module 101 can be minimized. As described above, in the present embodiment, the junction box 2 is provided at an end portion of the equipment module frame 11 (FIG. 2). In this case, the total extension of the second cable 22 tends to increase as compared with a case where the junction box 2 is disposed in the middle region of the plurality of instruments 3 as in the equipment module 101a of the example of the related art illustrated in FIG. 1. As the length of the second cable 22 increases, the time that is required to lay the second cable 22 may increase to that extent.

Meanwhile, as described above, the equipment module 101 is built at a factory different from the construction site of the LNG plant 1. Therefore, as illustrated in FIG. 2, in building the equipment module 101, work may be conducted to interconnect the secondary side connecting portion 204 of the junction box 2 and each instrument 3 in advance with the second cable 22. The equipment module 101 can be built prior to the construction work of the LNG plant 1 at the construction site of the LNG plant 1 or in parallel with the foundation work of the LNG plant 1 or the like. For this reason, even if the total extension is increased, the second cable 22 can be laid with the construction period of the LNG plant 1 almost unaffected as compared with a case where scaffolding installation and removal are performed at the construction site of the LNG plant 1.

It should be noted that FIG. 2 illustrates a state of connection between the junction box 2 and each instrument 3 via the second cable 22 in the floor where the junction box 2 is provided. Even in a case where the instrument 3 is provided in another floor, the second cable 22 is laid from the junction box 2 provided in the floor illustrated in FIG. 2 toward the instrument 3 in the other floor. Details of a configuration for laying the second cables 22 from the junction box 2 to other floors will be described with reference to FIGS. 4 and 5 to be described later.

After the construction of the equipment module 101 is completed with the junction box 2 and each instrument 3 connected by the second cable 22 in this manner, the equipment module 101 is transported to the construction site of the LNG plant 1. At the construction site, as illustrated in FIG. 3, each equipment module 101 is installed in a preset region such that the end portion provided with the junction box 2 faces the pipe rack 102. After that, work is conducted to lay the first cable 21 from the control room 103 toward each equipment module 101 through the cable tray 41 provided in the pipe rack 102.

The pipe rack 102 is provided with a branch cable tray 43 at the position where the first cable 21 is delivered to the equipment module 101, and the branch cable tray 43 branches from the main cable tray 41 toward the direction of disposition of the equipment module 101. During the work of laying the first cable 21, the direction of laying is changed toward the branch cable tray 43 side when the tip portion of the first cable 21 to be delivered reaches the position of disposition of the branch cable tray 43 corresponding to the delivery destination.

Then, when the tip portion of the first cable 21 reaches the terminal position of the branch cable tray 43, the tip portion of the first cable 21 is delivered from the laying worker on the pipe rack 102 side to the worker on the equipment module 101 side. The first cable 21 may be hand-delivered between the workers or, for example, the worker on the equipment module 101 side may pull a rope for delivery to pull the tip portion of the first cable 21 into the equipment module 101 side after the rope is delivered with the rope attached to the tip portion of the first cable 21.

Figure 4:
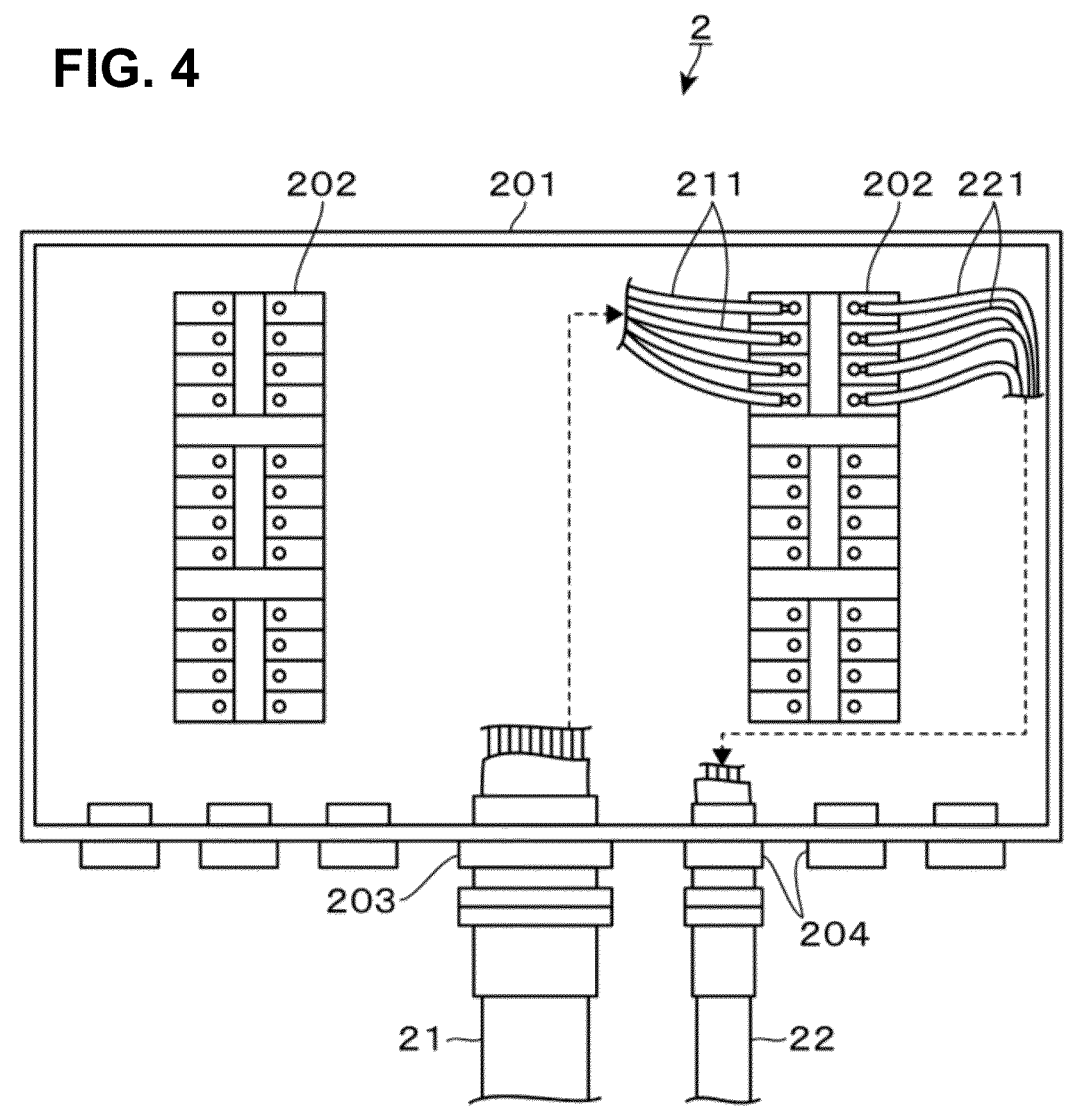

Here, as schematically illustrated in FIG. 4, each junction box 2 has, for example, a known configuration in which one or a plurality of terminal blocks 202 are provided on an inner wall surface of a housing 201 made of metal. For example, the primary side connecting portion 203 forming a port to which the tip portion of the first cable 21 is inserted and fixed is provided in a bottom surface of the housing 201. In addition, a plurality of the secondary side connecting portions 204 forming ports to which the base end portions of the second cables 22 are inserted and fixed are provided in, for example, the bottom surface of the housing 201.

As already described, the first cable 21 is configured by a multi-core cable, and the second cable 22 is configured by a single-core cable or a multi-core cable including a smaller number of core wires than the first cable 21. In this manner, the number of core wires 211 configuring the first cable 21 is larger than the number of core wires 221 configuring the second cable 22. Further, the core wires 211 of the first cable 21 are distributed and connected to the plurality of second cables 22 via the terminal block 202.

In order to avoid overcomplicating the illustrated contents, FIG. 4 illustrates a mode in which some of the core wires 211 of the first cable 21 and the core wires 221 of one second cable 22 configured by a multi-core cable are connected via one terminal block 202. In addition, the middle of the wiring for each of the core wires 211 and 221 is not illustrated in the housing 201, and the connection relationship of the core wires 211 and 221 between a primary side connecting portion 203 side and a terminal block 202 side and between the terminal block 202 side and a secondary side connecting portion 204 side is comprehensively indicated with broken arrows. When it is assumed that the surface illustrated in FIG. 4 is a front surface of the junction box 2, each junction box 2 is disposed with the front surface facing the inside of the equipment module frame 11 (direction opposite to a direction facing the pipe rack frame 12). An opening-closing door (not illustrated) is provided on a front surface (access surface) side of the junction box 2, and a worker can open the opening-closing door to access the inside of the junction box 2 and perform various works. It should be noted that regarding the disposition of the junction box 2, a configuration in which the front surface of the junction box 2 faces the outside of the equipment module frame 11 (direction facing the pipe rack frame 12) may be adopted.

After the first cable 21 is delivered to the equipment module 101 side, a worker on the equipment module 101 side connects the tip portion of the first cable 21 to the primary side connecting portion 203 of the junction box 2 disposed at the position facing the pipe rack 102. In this manner, by performing the work of connecting the first cables 21 associated with the junction boxes 2 in advance to all the respective junction boxes 2 provided in each equipment module 101 (including the work of connecting the core wires 211 to the terminal blocks 202), the work of connecting cables (the first cables 21) for power supply or signal exchange to each instrument 3 provided in the LNG plant 1 is completed.

Here, as already described, in the equipment module frame 11 configured in the plurality of floors, the junction boxes 2 are provided on a floor which is the second or higher floor and on which the work of delivering the first cables 21 is performed (hereinafter, also referred to a "delivery floor"). Further, the second cables 22 are laid toward the instruments 3 on other floors via these junction boxes 2 provided on the delivery floor.

Figure 5:
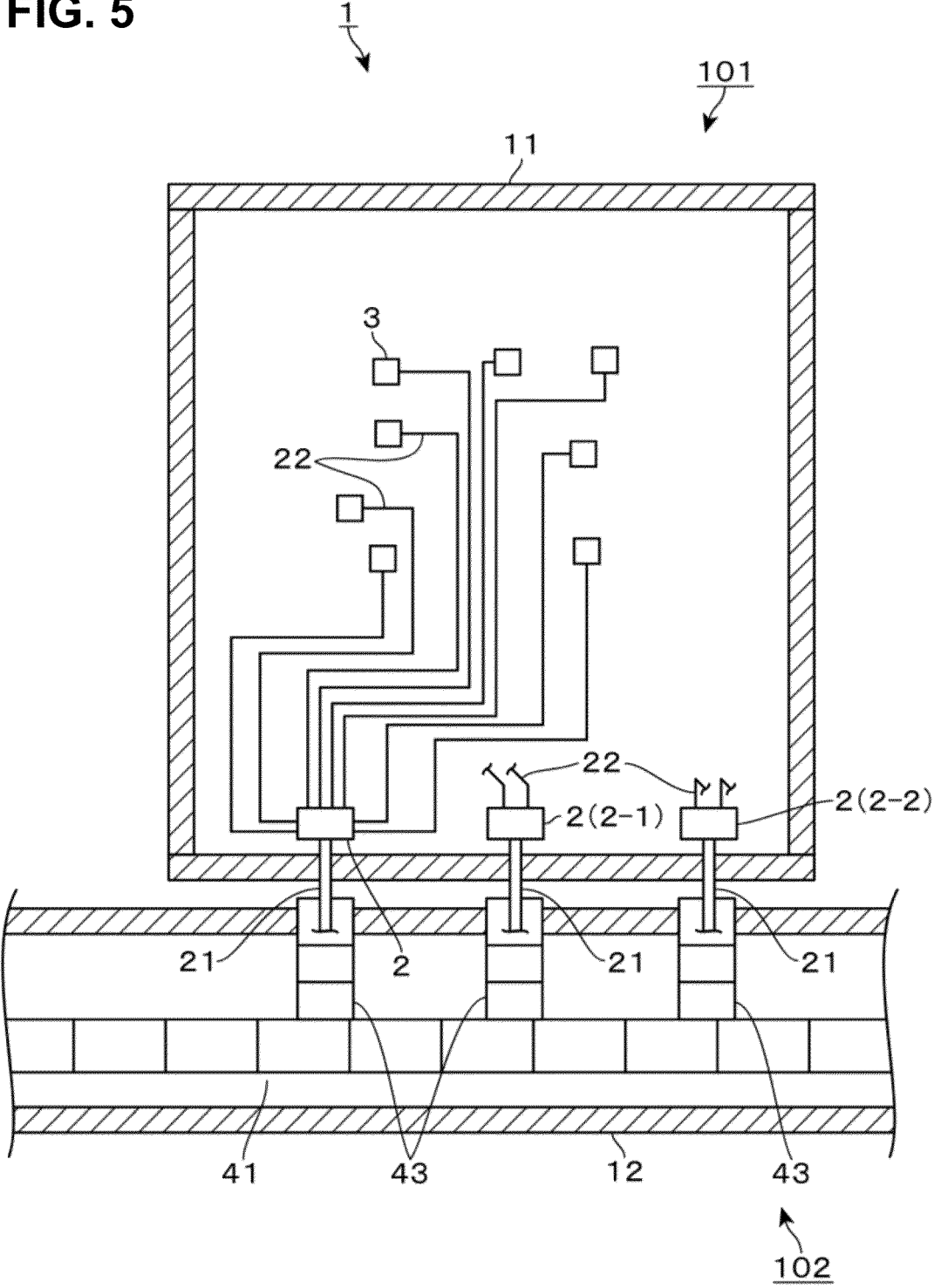
FIG. 5 is a plan view of the equipment module related to laying second cables 22 toward other floors.

FIG. 5 illustrates a mode in which three junction boxes 2 are provided at the end portion of the equipment module frame 11 on the delivery floor. The three junction boxes 2 are connected to the second cables 22 laid to each instrument 3 in the delivery floor, on an upper floor side, and on a lower floor side. In FIGS. 5 and 6, the junction box 2 connected to the instruments 3 on the upper floor side is labeled with reference sign "2-1", and the junction box 2 connected to the instruments 3 on the lower floor side is labeled with reference sign "2-2".

As schematically illustrated in FIG. 6, by also providing the junction boxes 2 (2-1 and 2-2) at the end portion of the equipment module frame 11 on the delivery floor for the instruments 3 provided on floors different from the delivery floor, the tip portions of the first cables 21 can be delivered without using scaffolding. Further, as already described, in each equipment module 101, the second cables 22 connected to the junction boxes 2 (2-1 and 2-2) and the instruments 3 on the upper floor side and the lower floor side can be laid in advance when the equipment module 101 is built at the factory.

It should be noted that for convenience of illustration, FIG. 6 schematically illustrates a state where the second cables 22 are laid from the junction box 2 (2-1) toward the instruments 3 on the upper floor side in the equipment module frame 11 on the left side of the drawing. In addition, a state where the second cables 22 are laid from the junction box 2 (2-2) toward the instruments 3 on the lower floor side in the equipment module frame 11 on the right side of the same drawing is schematically illustrated. However, as described with reference to FIG. 5, a plurality of the junction boxes 2 at which the connection with the second cables 22 laid to each instrument 3 in the delivery floor, on the upper floor side, and on the lower floor side is performed can be installed on the delivery floor.

In addition, when the second cables 22 are laid in the delivery floor, to the upper floor side, and to the lower floor side, it is not an essential requirement to provide one junction box 2 for each floor. For example, a plurality of the junction boxes 2 corresponding to one floor may be provided to correspond to the number of the instruments 3 disposed on each floor, or one junction box 2 may be shared between a plurality of floors.

The LNG plant 1 according to the present embodiment has the following effects. The equipment module 101 configuring the LNG plant 1 is provided with the junction box 2 for cable (first cable 21, second cable 22) relay at the end portion in the equipment module frame 11. Since the junction box 2 is provided at the end portion in the equipment module frame 11, the work of pulling in the first cable 21 that is performed in a case where the junction box 2 is provided in the middle region of the equipment module frame 11 does not occur. Therefore, scaffolding installation necessary during the pull-in work and scaffolding removal after the pull-in work become unnecessary, and the work of receiving the first cable 21 from the pipe rack 102 side and connecting the first cable 21 to the junction box 2 can be made efficient.

Figure 7:
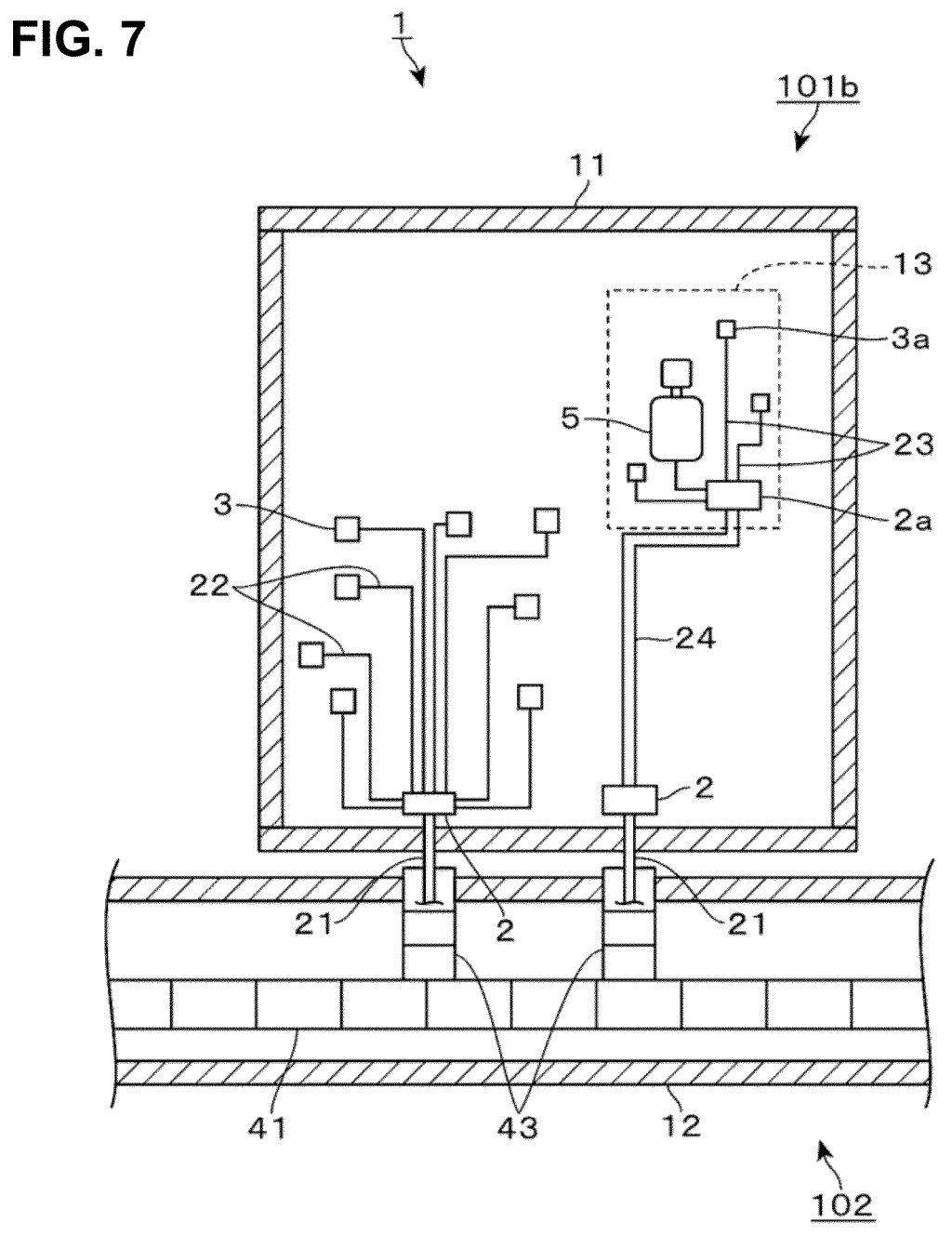

FIG. 7 illustrates a configuration example of the equipment module 101b according to a second embodiment. In the equipment module 101b of this example, a package equipment installation region 13 is provided in the equipment module frame 11, and at least one piece of package equipment 5 is provided in the package equipment installation region 13. For example, attached instruments and junction boxes may be packaged in relatively large equipment (package equipment 5) such as a compressor and a pump. In this case, the package equipment 5, a package instrument 3a, and a package junction box 2a are collectively installed in the package equipment installation region 13, and thus it may be difficult to provide the package junction box 2a at an end portion in the equipment module frame 11.

In such a case, as illustrated in FIG. 7, the independent junction box 2 that is not the package junction box 2a is provided at an end portion in the equipment module frame 11. Then, in building the equipment module 101b, the secondary side connecting portion 204 of the package junction box 2a and each package instrument 3a are connected in advance with a third cable 23 which is a single-core cable or a multi-core cable including a smaller number of core wires than the first cable 21. In addition, the secondary side connecting portion 204 of the junction box 2 and the primary side connecting portion 203 of the package junction box 2a are connected in advance with a fourth cable which is the same multi-core cable as the first cable 21. With the above configuration, the first cable 21 received from the pipe rack 102 may be connected to the primary side connecting portion 203 of the junction box 2 provided at an end portion of the equipment module frame 11, and thus the work of pulling in the first cable 21 that requires scaffolding does not occur even in a case where the package junction box 2a is provided in the middle region of the equipment module frame 11. In this case, the junction box 2 with the first cable 21 connected to the primary side connecting portion 203 and the fourth cable 24 connected to the secondary side connecting portion 204 serves as a splicing box interconnecting multi-core cables.

It should be noted that in a case where, for example, only one package instrument 3a is provided in the package equipment installation region 13, the first cable 21, the fourth cable 24, and the third cable 23 may be configured by single-core cables without exception.

Figures 8A, 8B:
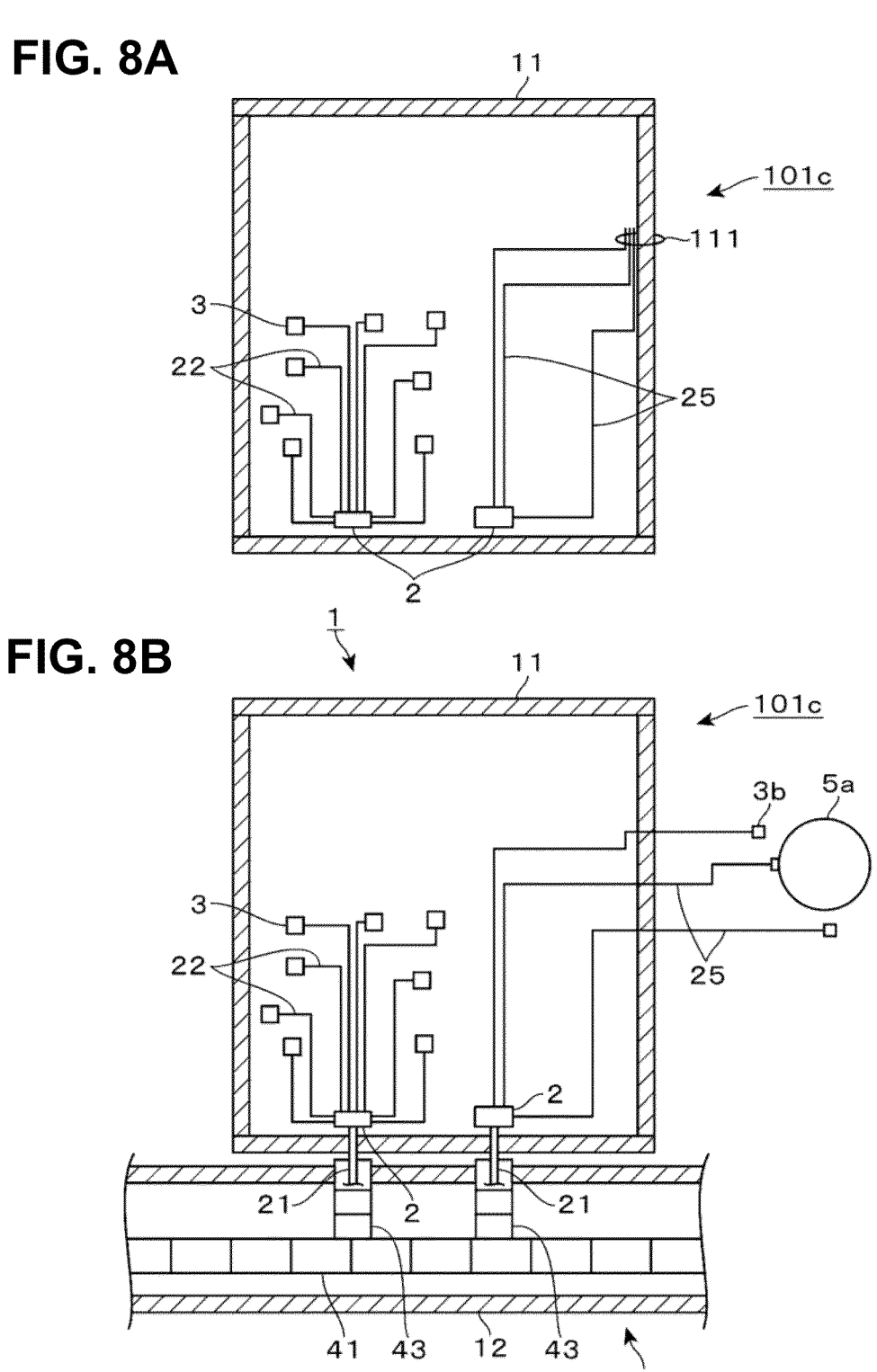
FIGS. 8A and 8B are plan views of an equipment module according to a third embodiment.

FIGS. 8A and 8B illustrate a configuration example of the equipment module 101c according to a third embodiment. For example, large equipment that cannot be easily incorporated into the equipment module frame 11 may be directly installed on a foundation provided at the construction site. In some cases, at least one external instrument 3b is attached with respect to external equipment 5a installed outside the equipment module 101c in this manner. In this case, the junction box 2 may be provided at an end portion in the equipment module frame 11 of the equipment module 101c disposed adjacent to the external equipment 5a and a cable (fifth cable 25) for power supply or signal exchange may be connected to the external instrument 3b via the junction box 2.

FIG. 8A is a plan view schematically illustrating the equipment module 101c that is yet to be installed at the construction site. As with each equipment module 101 described with reference to FIG. 2, regarding the instruments 3 provided in the equipment module 101c, the secondary side connecting portion 204 of the junction box 2 and each instrument 3 are interconnected in advance with the second cable 22 which is a single-core cable or a multi-core cable including a smaller number of core wires than the first cable 21.

Meanwhile, one end side of a fifth cable 25, which is a single-core cable or a multi-core cable including a smaller number of core wires than the first cable 21 connected to the external instrument 3b, is connected in advance to the secondary side connecting portion 204 of the junction box 2 provided at an end portion in the equipment module frame 11. In addition, the other end side of the fifth cable 25 is disposed while being bundled with, for example, a binding band 111 at a position facing the external instrument 3b when the equipment module 101c is disposed at a site adjacent to the external equipment 5a. Further, after the equipment module 101c is installed at the construction site of the LNG plant 1, the first cable 21 is connected to the primary side connecting portion 203 of each junction box 2 by the same method as the example described with reference to FIG. 3. Further, regarding the fifth cables 25, the binding with the binding band 111 is released and the fifth cables 25 are laid toward the region of installation of the external equipment 5a outside the equipment module 101c and respectively connected to the external instruments 3b. It should be noted that also in this example, the first cable 21 may be configured by a single-core cable in a case where one external instrument 3b is attached to the external equipment 5a.

Also in the configuration of the equipment module 101c described above, the first cable 21 received from the pipe rack 102 may be connected to the primary side connecting portion 203 of the junction box 2 provided at an end portion of the equipment module frame 11. Therefore, the work of laying the first cable 21 toward the external equipment 5a side does not occur as compared with a case where the junction box 2 is attached to the external equipment 5a provided outside the pipe rack 102. FIG. 9 illustrates, as a fourth embodiment, a case where pipe rack modules configuring a pipe rack 102a are equipment modules. Power supply and signal exchange via cables (first cable 21, second cable 22) are also performed with respect to the instruments 3 attached to equipment (such as the ACHEs 5b) provided in the pipe rack modules. Further, the first cable 21 as a multi-core cable and the second cable 22, which is a single-core cable or a multi-core cable including a smaller number of core wires than the first cable 21, are connected via the junction box 2, which is the same as in the equipment module 101 described with reference to FIGS. 2 and 3.

Meanwhile, the junction box 2 is provided along the cable tray 41 in the pipe rack module. With this configuration, the first cable 21 laid on the cable tray 41 from the control room 103 side can be connected at the shortest distance to the primary side connecting portion 203 of the junction box 2. Here, a case where the surface opposite to the front surface (access surface) on which the opening-closing door is provided is disposed to face the cable tray 41 side can be provided as an example of the direction of the junction box 2.

In addition, in building the pipe rack module at a factory different from the construction site of the LNG plant 1, it is possible to conduct the work of interconnecting the secondary side connecting portion 204 of the junction box 2 and each instrument 3 in advance with the second cable 22. It should be noted that also in this example, the first cable 21 may be configured by a single-core cable in a case where the pipe rack module is provided with one instrument 3.

The respective equipment modules 101, 101b, and 101c and the disposition of the junction boxes 2 in the pipe rack modules described above with reference to FIGS. 2 to 9 are not limited to application to the LNG plant 1 exemplified in the respective embodiments. Possible is application to petroleum refining plants, chemical plants, boiler plants, power-plants, waste treatment plants, and other various plants.

In addition, a plant to which the present technology is applied does not necessarily have to include the pipe rack 102 provided with the cable tray 41. For example, a dedicated frame may be provided to hold the cable tray 41 and the first cable 21 may be laid toward the equipment modules 101, 101b, and 101c via this cable tray 41. Further, in the equipment modules 101, 101b, and 101c and the pipe rack modules, it is not an essential requirement to pre-connect the second to fifth cables 22, 23, 24, and 25 to the junction box 2, the package junction box 2a, the instrument 3, the package instrument 3a, and the ACHE 5b. In a case where the plant construction period is hardly affected, the second to fifth cables 22, 23, 24, and 25 may be connected after, for example, the equipment modules 101, 101b, and 101c and the pipe rack modules are installed at the construction site.

The invention claimed is:

1. An equipment module configuring a plant where a fluid is handled, the equipment module comprising:

an equipment module frame with a multi-story structure
        in which equipment configuring the plant and at least
        one instrument used in operating the equipment are
        installed and in which, when a floor closest to a ground is referred to as a first floor, at least a second floor is disposed above the first floor; and a junction box for relaying a cable to perform power supply or signal exchange with respect to the instrument, wherein the junction box includes a primary side connecting portion to which a first cable extending from a control room installed outside the equipment module frame is connected, and a secondary side connecting portion to which a second cable extending from the instrument is connected, and the junction box is provided at an end portion in the second or higher floor of the equipment module frame.

2. The equipment module according to claim 1, wherein the junction box is provided on a delivery floor which is the second or higher floor and on which a work of delivering the first cable from the outside is performed, and the cable is also relayed to an instrument provided on a floor other than the delivery floor by the junction box provided on the delivery floor.

3. The equipment module according to claim 1, wherein the secondary side connecting portion and the instrument are connected in advance by the second cable.

4. The equipment module according to claim 3, wherein the first cable is a multi-core cable, and the second cable is a single-core cable or a multi-core cable including a smaller number of core wires than the first cable.

5. The equipment module according to claim 1, wherein a package area where package equipment configuring the plant, at least one package instrument attached to the package equipment, and a package junction box for relaying a cable to perform power supply or signal exchange with respect to the package instrument are collectively installed is provided, and a secondary side connecting portion of the package junction box and the package instrument are connected in advance by a third cable, and the secondary side connecting portion of the junction box and a primary side connecting portion of the package junction box are connected in advance by a fourth cable.

6. The equipment module according to claim 5, wherein the first cable and the fourth cable are multi-core cables, and the third cable is a single-core cable or a multi-core cable including a smaller number of core wires than the first cable and the fourth cable.

7. The equipment module according to claim 1, wherein a fifth cable is provided in order to perform power supply or signal exchange with respect to at least one external instrument configuring the plant and attached to external equipment provided outside the equipment module, and one end side of the fifth cable is connected to the secondary side connecting portion of the junction box, and the other end side is bundled at a position facing the external instrument in a state where the equipment module frame is disposed at a site adjacent to the external equipment.

8. The equipment module according to claim 7, wherein the first cable is a multi-core cable, and the fifth cable is a single-core cable or a multi-core cable including a smaller number of core wires than the first cable.

9. An equipment module configuring a plant where a fluid is handled, the equipment module comprising:

a pipe rack frame in which equipment configuring the plant and at least one instrument used in operating the equipment are installed and, further, which holds a pipe through which the fluid handled at the plant flows;

a junction box for relaying a cable to perform power supply or signal exchange with respect to the instrument; and a cable tray for holding a first cable extending from a control room installed outside the pipe rack frame, wherein the junction box includes a primary side connecting portion to which the first cable is connected, and a secondary side connecting portion to which a second cable extending from the instrument is connected, and the junction box is provided along the cable tray.

10. The equipment module according to claim 9, wherein, in the equipment module before the first cable is held by the cable tray, the secondary side connecting portion of the junction box and the instrument are connected in advance by the second cable.

11. The equipment module according to claim 10, wherein the first cable is a multi-core cable, and the second cable is a single-core cable or a multi-core cable including a smaller number of core wires than the first cable.

12. A plant where a fluid is handled, the plant comprising:

an equipment module including an equipment module frame with a multi-story structure in which equipment configuring the plant and at least one instrument used in operating the equipment are installed and in which, when a floor closest to a ground is referred to as a first floor, at least a second floor is disposed above the first floor, and a junction box for relaying a cable to perform power supply or signal exchange with respect to the instrument, in which the junction box includes a primary side connecting portion to which a first cable extending from a control room installed outside the equipment module frame is connected, and a secondary side connecting portion to which a second cable extending from the instrument is connected, and in which the junction box is provided at an end portion in the second or higher floor of the equipment module frame; and a pipe rack that is a frame holding the pipe through which the fluid flows and the first cable, wherein the equipment module is disposed adjacent to the pipe rack, and in the equipment module frame configuring the equipment module, the end portion is at a position facing the pipe rack.

13. The plant according to claim 12, comprising:

a plurality of the equipment modules disposed adjacent to the pipe rack, wherein in each of the equipment module frames configuring the respective equipment modules, the end portion is at the position facing the pipe rack.

* * * * *